(12) United States Patent
Corcoran

(10) Patent No.: US 11,655,597 B2
(45) Date of Patent: *May 23, 2023

(54) RECYCLED ASPHALT COMPOSITIONS AND METHODS THEREOF

(71) Applicant: MANHOLE ADJUSTING INC., Pico Rivera, CA (US)

(72) Inventor: John Corcoran, Pico Rivera, CA (US)

(73) Assignee: MANHOLE ADJUSTING INC., Pico Rivera, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/104,738

(22) Filed: Nov. 25, 2020

(65) Prior Publication Data
US 2021/0079599 A1 Mar. 18, 2021

Related U.S. Application Data

(63) Continuation of application No. 16/855,974, filed on Apr. 22, 2020, now Pat. No. 10,851,500.

(Continued)

(51) Int. Cl.
*E01C 7/18* (2006.01)
*C08L 95/00* (2006.01)
(Continued)

(52) U.S. Cl.
CPC .............. *E01C 7/187* (2013.01); *C08L 95/00* (2013.01); *E01C 7/22* (2013.01); *E01C 7/265* (2013.01);
(Continued)

(58) Field of Classification Search
CPC ............ E01C 7/187; E01C 7/22; E01C 7/265; E01C 7/353; E01C 7/358; C08L 95/00; C08L 2555/60; C08L 2555/80
(Continued)

(56) References Cited

U.S. PATENT DOCUMENTS 4,548,650 A   10/1985   Kietzman
6,495,074 B1  12/2002   Carr
(Continued)

OTHER PUBLICATIONS

The "Greenbook", Standard Specification for Public Works Construction, Section 203-2 Liquid Asphalt, pp. 82-85, 2018.
Boulange et al., "Semi-Cold Mixes With 100 % Recycled Materials," 5th Eurasphalt & Eurobitume Congress, 6 pages, Jun. 13-15, 2012.

*Primary Examiner* — Raymond W Addie
(74) *Attorney, Agent, or Firm* — Lewis Roca Rothgerber Christie LLP

(57) ABSTRACT

A pavement composition includes a recycled hot mix asphalt (HMA) sheet mix composition including more than 50% and up to 100% recycled fines mixed with a rejuvenating agent. The recycled fines of the HMA sheet mix are separated from a reclaimed asphalt pavement (RAP) composition and substantially all of the recycled fines are capable of passing through a sieve having an opening size of ⅜ inch (9.5 mm). Pavement systems include an existing pavement layer and a thin-lift overlay made of the recycled HMA sheet mix on the existing pavement layer. Pavement systems also include a three-layer system including a leveling course layer, an interlayer, and a surface course layer in which the leveling course layer and/or the surface course layer include a recycled HMA sheet mix composition.

7 Claims, 4 Drawing Sheets

Related U.S. Application Data

(60) Provisional application No. 62/837,687, filed on Apr. 23, 2019.

(51) Int. Cl.
 *E01C 7/22* (2006.01)
 *E01C 7/26* (2006.01)
 *E01C 7/35* (2006.01)

(52) U.S. Cl.
 CPC .............. *E01C 7/353* (2013.01); *E01C 7/358* (2013.01); *C08L 2555/60* (2013.01); *C08L 2555/80* (2013.01)

(58) Field of Classification Search
 USPC ................................................ 404/17, 72–75
 See application file for complete search history.

(56) References Cited

U.S. PATENT DOCUMENTS

| | | |
|---|---|---|
| 8,404,037 B2 | 3/2013 | Naidoo et al. |
| 8,444,760 B2 | 5/2013 | Crews et al. |
| 10,053,820 B2 * | 8/2018 | Kriech .................... E01C 7/187 |
| 10,851,500 B2 * | 12/2020 | Corcoran ................ E01C 7/265 |
| 2007/0261337 A1 | 11/2007 | Whitaker et al. |
| 2008/0060551 A1 | 3/2008 | Crews et al. |
| 2011/0283920 A1 | 11/2011 | Barger et al. |
| 2012/0180702 A1 | 7/2012 | Ribeiro |
| 2013/0180431 A1 | 7/2013 | Myszak, Jr. et al. |
| 2013/0195552 A1 * | 8/2013 | McDade ................ E01C 19/48 524/60 |
| 2015/0252534 A1 | 9/2015 | Dempsey et al. |
| 2018/0215919 A1 | 8/2018 | Reinke et al. |
| 2018/0265704 A1 | 9/2018 | Puchalski et al. |
| 2020/0048466 A1 | 2/2020 | McDade |

\* cited by examiner

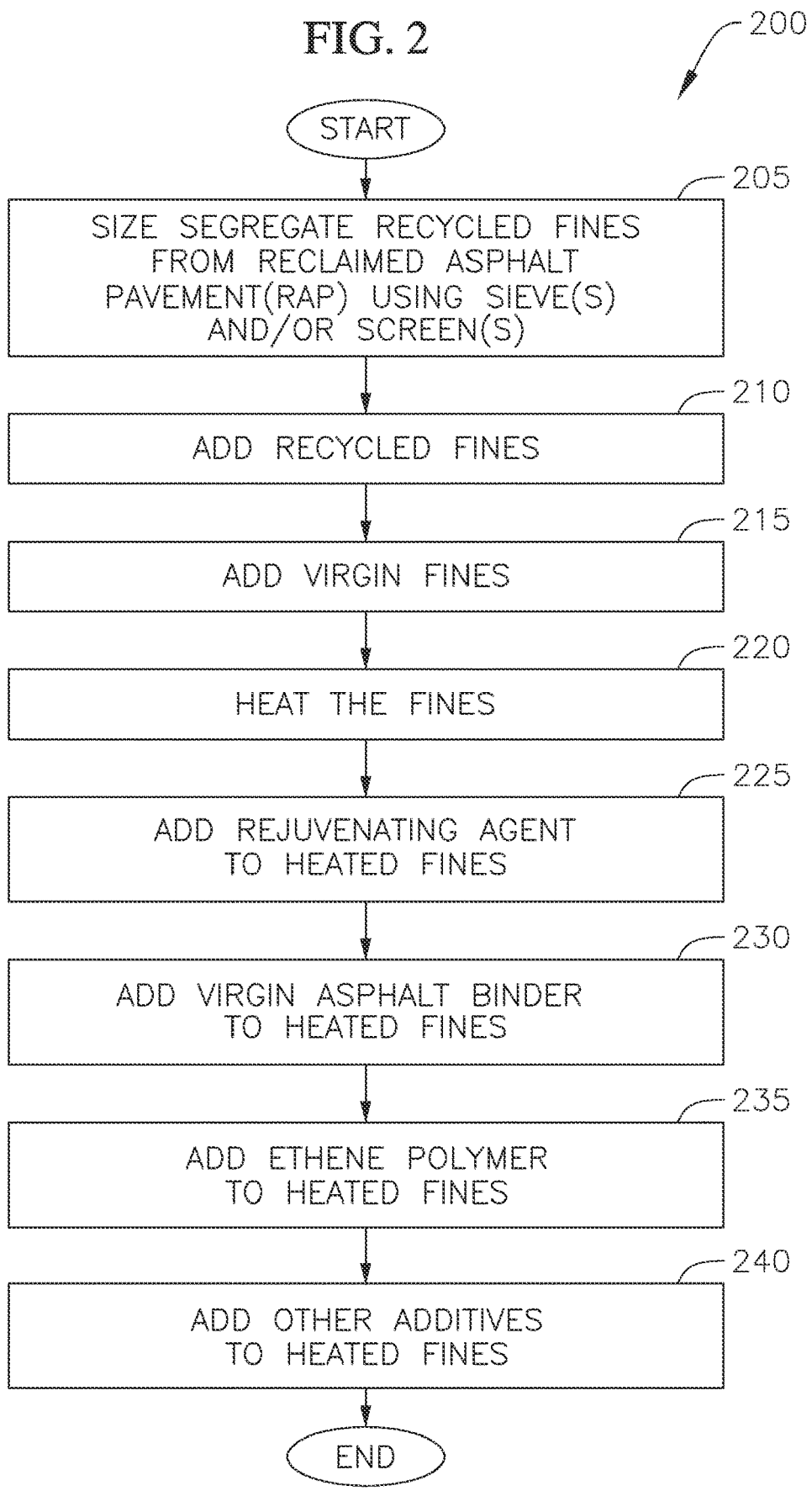

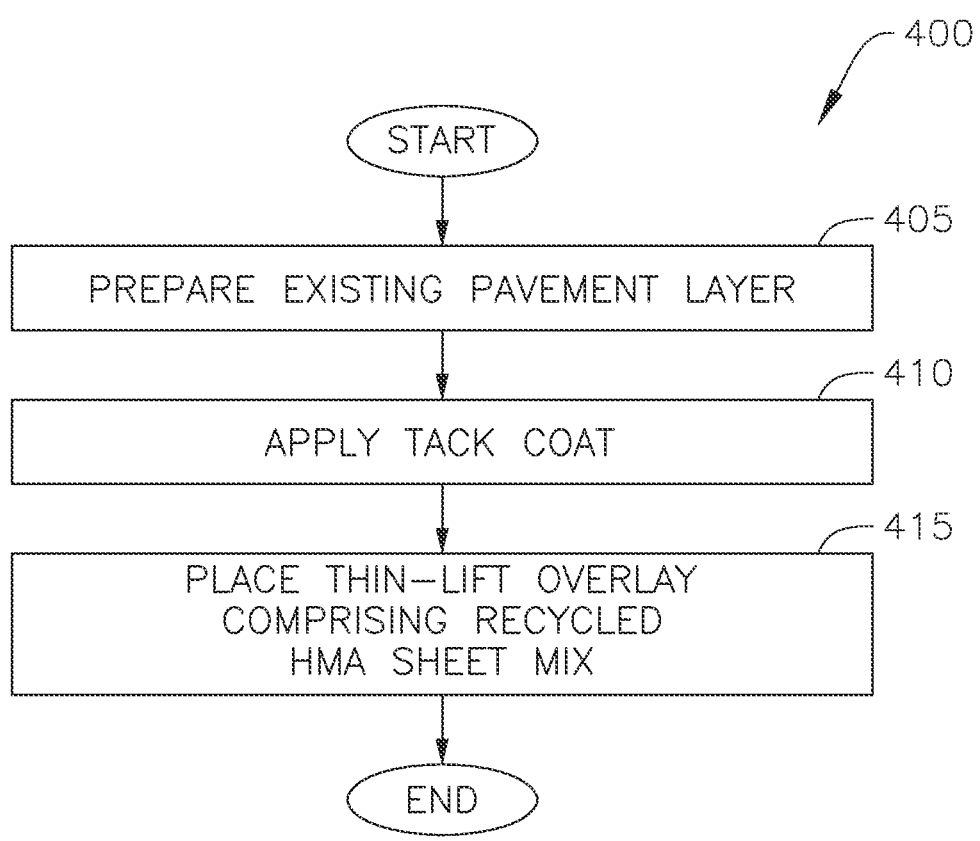

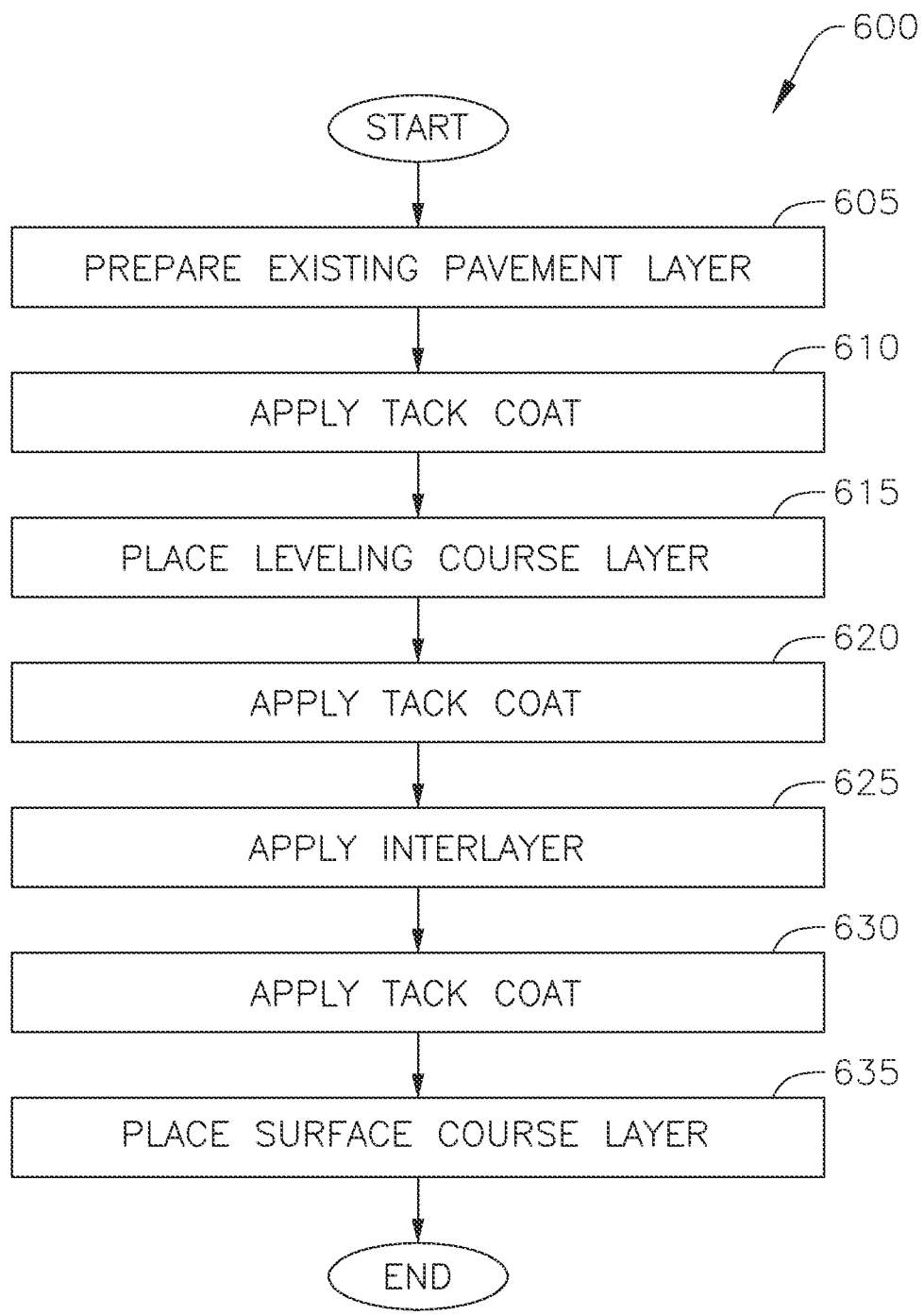

RECYCLED ASPHALT COMPOSITIONS AND METHODS THEREOF

CROSS-REFERENCE TO RELATED APPLICATION(S)

The present application is a continuation of U.S. patent application Ser. No. 16/855,974, filed Apr. 22, 2020 in the U.S. Patent and Trademark Office, which claims priority to and the benefit of U.S. Provisional Patent Application No. 62/837,687, filed Apr. 23, 2019 in the U.S. Patent and Trademark Office, the entire content of both of which is incorporated herein by reference.

BACKGROUND

1. Field

Aspects of the present disclosure relate generally to a pavement composition and methods of making and applying a pavement composition.

2. Description of Related Art

Reclaimed asphalt pavement (RAP) is the term given to removed and/or reprocessed pavement materials containing asphalt and aggregates. These RAP materials are generated when hot mix asphalt (HMA) pavements are removed for reconstruction, resurfacing, or to obtain access to buried utilities.

It is estimated that as much as 45 million tons of RAP may be produced each year in the United States, and that some of the RAP that is generated but not recycled or used during the same construction season is stockpiled. In some states where transport and land space is not available, the stockpiles may be on or near roadsides and residential areas, creating dust and related health impacts as well as unsightly landscapes. The National Asphalt Pavement Association (NAPA) estimated that the total amount of RAP stockpiled nationwide at the end of the 2017 construction season was about 102.1 million tons.

SUMMARY

Aspects of the present disclosure include embodiments directed to a pavement composition including a recycled hot mix asphalt (HMA) sheet mix composition. In some embodiments, the pavement composition includes a recycled HMA sheet mix composition having more than 50% to 100% recycled fines separated from a reclaimed asphalt pavement (RAP) composition, where substantially all of the more than 50% to 100% recycled fines are capable of passing through a sieve having an opening size of ⅜ inch (9.5 mm). The recycled HMA composition also includes a rejuvenating agent mixed with the more than 50% to 100% recycled fines.

In some embodiments of the present disclosure, the pavement composition includes the recycled HMA sheet mix composition as described above and also includes a virgin asphalt binder.

In some embodiments of the present disclosure, the virgin asphalt binder includes neat paving grade asphalt binders, polymer modified binders, Performance Grade (PG) asphalt binders, PG modified asphalt binders, polymer-modified asphalt binders, rubber-modified asphalt binders, or combinations thereof.

In some embodiments of the present disclosure, the pavement composition further includes one or more additives, such as a warm mix additive, a polyester and/or aramid fiber, hydrated lime, a plastic additive, or combinations thereof.

In some embodiments of the present disclosure, the pavement composition includes the recycled HMA sheet mix composition as described above, where up to 25% of the more than 50% to 100% recycled fines are capable of passing through a No. 200 (0.075 mm) sieve.

In some embodiments of the present disclosure, the pavement composition includes the recycled HMA sheet mix composition as described above, where 100% of the more than 50% to 100% recycled fines are capable of passing through a No. 4 (4.75 mm) sieve.

In some embodiments of the present disclosure, the pavement composition includes the recycled HMA sheet mix composition as described above, where up to 25% of the more than 50% to 100% recycled fines are capable of passing through a No. 200 (0.075 mm) sieve.

In some embodiments of the present disclosure, the pavement composition includes the recycled HMA sheet mix composition as described above, where of the more than 50% to 100% recycled fines, 100% by dry aggregate weight is capable of passing through a ⅜ inch (9.5 mm) sieve, 70% to 90% by dry aggregate weight is capable of passing through a No. 4 (4.75 mm) sieve, 53% to 73% by dry aggregate weight is capable of passing through a No. 8 (2.36 mm) sieve, 26% to 42% by dry aggregate weight is capable of passing through a No. 30 (0.600 mm) sieve, 18% to 30% by dry aggregate weight is capable of passing through a No. 50 (0.300 mm) sieve, and 9% to 15% by dry aggregate weight is capable of passing through a No. 200 (0.075 mm) sieve.

In some embodiments of the present disclosure, the pavement composition includes the recycled HMA sheet mix composition as described above, where of the more than 50% to 100% recycled fines, 100% by dry aggregate weight is capable of passing through a ⅜ inch (9.5 mm) sieve, 95% to 100% by dry aggregate weight is capable of passing through a No. 4 (4.75 mm) sieve, 79% to 93% by dry aggregate weight is capable of passing through a No. 8 (2.36 mm) sieve, 40% to 54% by dry aggregate weight is capable of passing through a No. 30 (0.600 mm) sieve, 27% to 39% by dry aggregate weight is capable of passing through a No. 50 (0.300 mm) sieve, and 13% to 19% by dry aggregate weight is capable of passing through a No. 200 (0.075 mm) sieve.

In some embodiments of the present disclosure, the rejuvenating agent is an aromatic oil including asphaltenes and/or maltenes.

In some embodiments of the present disclosure, the recycled hot mix asphalt sheet mix composition consists essentially of the more than 50% to 100% recycled fines, 0 to less than 50% virgin fines, and the rejuvenating agent.

The present disclosure also includes embodiments directed to methods of making the pavement composition described above. In some embodiments of the present disclosure, the method includes separating the more than 50% to 100% recycled fines from the RAP composition using a ⅜-inch (9.5 mm) sieve, heating the recycled fines to form a heated mixture of fines, and adding a rejuvenating agent to the heated mixture of fines to form the recycled hot mix asphalt sheet mix composition described above.

In some embodiments of the present disclosure, the method includes adding up to 50% virgin fines to the 50% to 100% recycled fines. The virgin fines are capable of passing through a sieve having an opening size of ⅜ inch (9.5 mm) or less.

In some embodiments of the present disclosure, heating the recycled fines includes heating the recycled fines at a temperature in a range from about 175° F. to about 400° F.

In some embodiments of the present disclosure, the rejuvenating agent is an aromatic oil including asphaltenes and/or maltenes.

In some embodiments of the present disclosure, the method includes adding a virgin asphalt binder to the heated mixture of fines. The virgin asphalt binder may include neat paving grade asphalt binders, polymer modified binders, Performance Grade (PG) asphalt binders, PG modified asphalt binders, polymer-modified asphalt binders, rubber-modified asphalt binders, or combinations thereof.

In some embodiments of the present disclosure, the method may include adding an additive to the heated mixture of fines. The additive may be a warm mix additive, a polyester and/or aramid fiber, hydrated lime, a plastic additive, or combinations thereof.

The present disclosure also includes embodiments directed to a pavement system. In some embodiments of the present disclosure, the pavement system includes a thin-lift overlay on an existing pavement layer, and the thin-lift overlay includes the recycled hot mix asphalt (HMA) sheet mix composition described above.

In some embodiments of the present disclosure, the pavement system also includes a tack coat between the existing pavement layer and the thin-lift overlay.

The existing pavement layer may be either a prepared existing pavement layer or an unprepared existing pavement layer.

In some embodiments of the present disclosure, the prepared existing pavement layer is a chip seal pavement, a slurry seal, a micro-milled pavement surface, or a cold planed pavement surface.

In some embodiments, the pavement system includes a micro-milled surface on the existing pavement layer, and an asphalt-rubber aggregate membrane (ARAM) on the micro-milled surface. The asphalt-rubber aggregate membrane (ARAM) is between the existing pavement layer and the thin-lift overlay.

In some embodiments of the present disclosure, the recycled hot mix asphalt sheet mix composition has a thickness in a range from about ⅛ inch to about 2 inches.

In some embodiments of the present disclosure, the pavement system includes a leveling course layer, an interlayer, and a surface course layer. The interlayer is between the leveling course layer and the surface course layer, and at least one of the leveling course layer and the surface course layer includes the recycled hot mix asphalt (HMA) sheet mix composition described above.

In some embodiments of the present disclosure, the interlayer is an asphalt rubber interlayer.

In some embodiments of the present disclosure, the pavement system includes a tack coat on the interlayer.

In some embodiments of the present disclosure, the pavement system has a thickness of about 2 inches.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable composition or method of making or applying the composition.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 2 is a flowchart illustrating tasks of a method of making a recycled HMA sheet mix composition according to one embodiment of the present disclosure;

FIG. 4 is a flowchart illustrating tasks of a method of making the embodiment of the pavement system illustrated in FIG. 3 according to one embodiment of the present disclosure;

FIG. 6 is a flowchart illustrating tasks of a method of making the embodiment of the three-layer pavement system illustrated in FIG. 5 according to one embodiment of the present disclosure.

DETAILED DESCRIPTION

Figure 1:
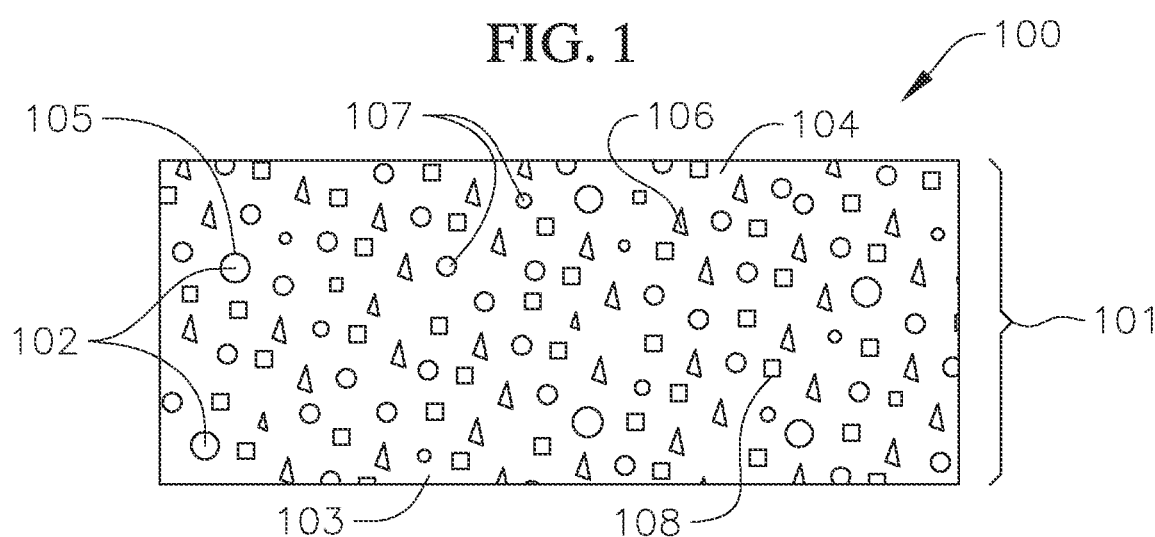
FIG. 1 is a schematic cross-sectional view of a recycled hot mix asphalt (HMA) sheet mix composition of a pavement composition according to one embodiment of the present disclosure.

Asphalt refers to a highly viscous, tar-like substance of petrochemical origin that is also commonly known as bitumen. Asphalt occurs naturally and is a common product of petrochemical fractionation. The compounds making up asphalt (i.e., "asphalts" or "binder") are highly complex and not well-characterized materials containing saturated and unsaturated aliphatic and aromatic compounds with up to 150 carbon atoms. The make-up of a given asphalt mix may vary depending on the source of crude oil. Many of the asphalt compounds contain oxygen, nitrogen, sulfur, and other heteroatoms. Asphalts typically contain about 80% by weight of carbon, about 10% hydrogen, up to about 6% sulfur, small amounts of oxygen and nitrogen, and trace amounts of metals such as iron, nickel, and vanadium. The molecular weights of the constituent compounds range from several hundred to many thousands. The compounds are classified as asphaltenes or maltenes according to their solubility in hexane or heptane. Asphaltenes are high molecular weight species that are insoluble in these solvents, whereas maltenes have lower molecular weights and are soluble. Asphalts normally contain between about 5 and about 25% by weight of asphaltenes and may be regarded as colloids of asphaltene micelles dispersed in maltenes.

Hot mix asphalt (HMA) is also referred to as asphalt concrete. HMA is made of a mixture of paving grade asphalt (the bituminous asphalt as disclosed above) with one or more aggregate materials ("aggregates"), the mixture typically being composed of about 91% to about 95% by weight of aggregate. The bituminous asphalt in HMA is also referred to as a bituminous binder material as it is used to bind the aggregates together in the mixture. Additionally, bituminous asphalt mixed with any aggregate to form a paving material may be supplemented with additives of various known kinds to form a modified asphalt paving material (e.g., modified HMA) in order to improve various properties (e.g., resistance to one or more of: rutting, thermal cracking, fatigue damage, stripping, and temperature susceptibility) of the paving material which incorporates such additives.

The use of reclaimed asphalt pavement (RAP) material as a substitute for virgin aggregate in the production of HMA is known in the art and has been assigned standards including methods of making and protocols of use. In particular, the use of up to 20% or 25% RAP in the production of HMA has been the standard in California as disclosed respectively in The Greenbook, 2018, Section 203-6, and Section 39 "Asphalt Concrete" and Section 92 "Asphalt Binders" in the book of "Standard Specifications", 2015, published by the State of California Department of Transportation (Caltrans), the entire contents of all of which are incorporated herein by reference. The rationale for using a limited amount of RAP in the production of HMA is based on the variations found in any particular RAP, thereby influencing the properties of any HMA it may be added to. The implementation of a lower limit on the amount of RAP in HMA avoids issues with variability and allows for the selected binder grades for a particular HMA to remain the same whether the HMA is made with all virgin aggregate and virgin binder or a mix of RAP and virgin aggregate and/or virgin binder. Accordingly, a pavement composition made from an increased amount of RAP is desired for utilizing more of the resources found in the stockpiled RAP piles thereby allowing for a more environmentally resourceful process.

As used herein, a hot mix asphalt (HMA) sheet mix has a higher content of bituminous asphalt (i.e. binder material) compared to HMA mixtures having coarser (larger) aggregate because the fine aggregate of the HMA sheet mix has increased surface area. See, e.g., Hot-Mix Asphalt Paving Handbook, Appendix 1, Part I, 2001, U.S. Army Corps of Engineers, AC 150/5370-14A, the entire content of which is incorporated herein by reference. As used herein, "HMA sheet mix," "sheet mix," "asphalt sheet mix," "sand mix," "sand asphalt," and "asphalt sand mix" are used interchangeably and refer to a HMA sheet mix that is made of fine aggregate in the absence of coarse aggregate. These fine aggregates may also be referred to as "fines." More specifically, as generally understood and as used herein in the present disclosure, a recycled HMA sheet mix (sheet mix, asphalt sheet mix, sand mix, sand asphalt, or asphalt sand mix) refers to an HMA sheet mix having more than 50% recycled fines of which 100% of the more than 50% recycled fines are capable of passing through a sieve having an opening size of ⅜ inch (9.5 mm). Non-limiting examples of coarser HMA mixtures having larger aggregate than the presently disclosed recycled HMA sheet mix include conventional dense-graded HMA, large-stone dense-graded HMA, an open-graded HMA, or a gap-graded HMA such as a stone matrix asphalt (SMA), as defined, e.g., in Hot-Mix Asphalt Paving Handbook, Appendix 1, Part I, 2001, U.S. Army Corps of Engineers, AC 150/5370-14A, supra.

It is conventionally understood that unless manufactured sand or an angular natural sand is added to sheet mix, the stability of sheet mix is low (e.g., the stability of HMA sheet mix is lower than HMA having larger than ⅜ inch aggregate gradation sizes), and therefore the use of sheet mix in the art has limitations and restrictions. In particular, the use of a sheet mix in a thin-lift overlay has been standardized to account for the less stable characteristics of sheet mix. In practice, thin-lift HMA overlays are applied to an underlying pavement layer in the preparation of a new pavement system or in the repairing of an existing pavement system. As used herein, the terms "thin-lift HMA overlays," "thin asphalt overlays," "thin-lift overlays," "thin-lift asphalt overlays," "and "thinlays" are used interchangeably. Depending on the condition and type of the pavement, thin-lift overlays may be applied to any suitable pavement layer. Depending on the method used, type and condition of pavement layer, as well as the duration of the application process, in some embodiments, the application of the thin-lift overlay may include applying a tack coat to bond the thin-lift overlay onto the underlying pavement layer.

The conventional standard for thickness of a thin-lift overlay is 3 to 5 times the Nominal Maximum Aggregate Size (NMAS) of the applied sheet mix. As used herein, the term "Nominal Maximum Aggregate Size (NMAS)" refers to one sieve size larger than the first sieve to retain more than 10 percent in a standard series of sieves. The calculation of the thin-lift overlay thickness being 3 to 5 times the NMAS of the sheet mix is based on the finer aggregate sheet mix being less permeable than HMA having coarser aggregates, and the less permeable sheet mix in an overlay application must be capable of withstanding traffic loads without rutting or polishing. ("Thin-Lift Overlays: Points to Ponder," Presentation by Danny Gierhart, World of Asphalt 2012 Show and Conference, the entire content of which is incorporated herein by reference.) For example, according to current standards, a thin-lift overlay applied to a pavement using a sheet mix having a NMAS of ⅜ inch requires a thickness of 1⅛ inches to 1⅞ inches. This calculated overlay thickness is the conventional standard that has been accepted as necessary to be effective when using a sheet mix having a NMAS of ⅜ inch. However, contrary to current standards, in some embodiments of the present disclosure, using the recycled HMA sheet mix as disclosed herein (with or without additives), in which the NMAS of the recycled HMA sheet mix is not known or the NMAS is ⅜ inch or less, the recycled HMA sheet mix may be effectively applied as an "ultra" thin-lift overlay having a thickness that is less than 1⅛ inches to 1⅞ inches. As disclosed in more detail in this disclosure, the thickness of a thin-lift overlay applied to or as part of a pavement system includes applying the recycled HMA sheet mix of the present disclosure in a range from ⅛ inch up to 2 inches to a pavement base surface or to a surface that has been prepared to receive a thin-lift overlay. In some embodiments of the present disclosure, the thin-lift overlay made with a recycled HMA sheet mix composition has a thickness of ⅛ inch up to 1⅞ inches, 1¾ inches, 1⅝ inches, 1½ inches, 1⅜ inches, 1¼ inches, or 1 inch. In some embodiments of the present disclosure, the thin-lift overlay made with a recycled HMA sheet mix composition has a thickness of ⅛ inch up to ⅞ inch, ¾ inch, ⅝ inch, ½ inch, or ¼ inch. In still other embodiments, the thin-lift overlay made with a recycled HMA sheet mix composition has a thickness of ¼ inch up to 2 inches, ¼ inch up to 1⅞ inches, ¼ inch up to 1¾ inches, ¼ inch up to 1⅝ inches, ¼ inch up to 1½ inches, ¼ inch up to 1⅜ inches, ¼ inch up to 1¼ inches, ¼ inch up to 1 inch, ¼ inch up to ⅞ inch, ¼ inch up to ¾ inch, ¼ inch up to ⅝ inch, or ¼ inch up to ½ inch.

FIG. 1 depicts a pavement composition 100 made of a recycled HMA sheet mix composition 101 in which the recycled HMA sheet mix 101 is made of recycled fines 102 separated from a reclaimed asphalt pavement (RAP) composition. The recycled fines 102 of the recycled HMA sheet mix composition 101 may be characterized by their sizes and each recycled HMA sheet mix composition 101 may be characterized by the amounts (measured in percent by dry aggregate weight) of each size of the recycled fines 102 measured by the type/size of sieve the recycled fines 102 can pass through. Whether indicated or not, all of the percentages of recycled fines 102 as disclosed herein are measured by dry weight aggregate. In some embodiments of the present disclosure, 100% (by dry aggregate weight) of the recycled fines 102 of the recycled HMA sheet mix 101 are capable of passing through a ⅜-inch (9.5 mm) sieve. In some embodiments of the present disclosure, 100% (by dry aggregate weight) of the recycled fines 102 of the recycled HMA sheet mix 101 are capable of passing through a ⅜-inch (9.5 mm) sieve and up to 25% (by dry aggregate weight) of the recycled fines 102 of the recycled HMA sheet mix 101 are capable of passing through a No. 200 (0.075 mm) sieve. As used herein, the term "up to" as in e.g., "up to 25% of the recycled fines" also refers to "no more than" as in e.g., "no more than 25% recycled fines." Additionally, in some embodiments, a composition of the recycled HMA sheet mix 101 includes 100% of the recycled fines 102 being capable of passing through a ⅜-inch (9.5 mm) sieve and also has up to 20%, up to 15%, up to 10%, or up to 5% of the recycled fines 102 of the recycled HMA sheet mix 101 being capable of passing through a No. 200 (0.075 mm) sieve.

In some embodiments of the present disclosure, 100% (by dry aggregate weight) of the recycled fines 102 of the recycled HMA sheet mix 101 are capable of passing through a No. 4 (4.75 mm) sieve. In some embodiments of the present disclosure, 100% of the recycled fines 102 of the recycled HMA sheet mix 101 are capable of passing through a No. 4 (4.75 mm) sieve and up to 25% of the recycled fines 102 of the recycled HMA sheet mix 101 are capable of passing through a No. 200 (0.075 mm) sieve. Additionally, in some embodiments, a composition of recycled HMA sheet mix 101 includes 100% of the recycled fines 102 being capable of passing through a No. 4 (4.75 mm) sieve and has up to 20%, up to 15%, up to 10%, or up to 5% of the recycled fines 102 of the recycled HMA sheet mix 101 being capable of passing through a No. 200 (0.075 mm) sieve.

In some embodiments of the present disclosure, 65% to 85% (by dry aggregate weight) of the recycled fines 102 of the recycled HMA sheet mix 101 are capable of passing through a No. 4 (4.75 mm) sieve. In some embodiments, 45% to 65% of the recycled fines 102 of the recycled HMA sheet mix 101 are capable of passing through a No. 8 (2.36 mm) sieve. In some embodiments, 22% to 38% of the recycled fines 102 of the recycled HMA sheet mix 101 are capable of passing through a No. 30 (0.600 mm) sieve. In some embodiments, 16% to 28% of the recycled fines 102 of the recycled HMA sheet mix 101 are capable of passing through a No. 50 (0.300 mm) sieve. In some embodiments, 6% to 12% of the recycled fines 102 of the recycled HMA sheet mix 101 are capable of passing through a No. 200 (0.075 mm) sieve.

In some embodiments, the recycled HMA sheet mix 101 is made of an "extra fine" gradation mix of fines in which 100% of the recycled fines 102 are capable of passing through a ⅜ inch (9.5 mm) sieve, 65% to 85% of the recycled fines 102 are capable of passing through a No. 4 (4.75 mm) sieve, 45% to 65% of the recycled fines 102 are capable of passing through a No. 8 (2.36 mm) sieve, 22% to 38% of the recycled fines 102 are capable of passing through a No. 30 (0.600 mm) sieve, 16% to 28% of the recycled fines 102 are capable of passing through a No. 50 (0.300 mm) sieve, and 6% to 12% of the recycled fines 102 are capable of passing through a No. 200 (0.075 mm) sieve.

In one or more embodiments, 100% (by dry aggregate weight) (i.e., all or substantially all) of the recycled fines 102 of the recycled HMA sheet mix 101 are capable of passing through a ⅜ inch (9.5 mm) sieve, 70% to 90% (by dry aggregate weight) of the recycled fines 102 are capable of passing through a No. 4 (4.75 mm) sieve, 53%-73% (by dry aggregate weight) of the recycled fines 102 are capable of passing through a No. 8 (2.36 mm) sieve, 26%-42% (by dry aggregate weight) of the recycled fines 102 are capable of passing through a No. 30 (0.600 mm) sieve, 18%-30% (by dry aggregate weight) of the recycled fines 102 are capable of passing through a No. 50 (0.300 mm) sieve, and 9%-15% (by dry aggregate weight) of the recycled fines 102 are capable of passing through a No. 200 (0.075 mm) sieve.

In one or more embodiments, 100% (by dry aggregate weight) of the recycled fines 102 of the recycled HMA sheet mix 101 are capable of passing through a ⅜ inch (9.5 mm) sieve, 95% to 100% (by dry aggregate weight) of the recycled fines 102 are capable of passing through a No. 4 (4.75 mm) sieve, 79%-93% (by dry aggregate weight) of the recycled fines 102 are capable of passing through a No. 8 (2.36 mm) sieve, 40%-54% (by dry aggregate weight) of the recycled fines 102 are capable of passing through a No. 30 (0.600 mm) sieve, 27%-39% (by dry aggregate weight) of the recycled fines 102 are capable of passing through a No. 50 (0.300 mm) sieve, and 13%-19% (by dry aggregate weight) of the recycled fines 102 are capable of passing through a No. 200 (0.075 mm) sieve.

Without being bound by any particular mechanism or theory, it is believed that the reclaimed asphalt pavement (RAP) from which the recycled fines 102 are separated becomes oxidized and the asphaltenes and maltenes are lost. Accordingly, in one or more embodiments, the recycled HMA sheet mix 101 includes a rejuvenating agent 103 (e.g., an aromatic oil) to hold the recycled fines 102 together and to restore the lost asphaltenes and maltenes. The recycled HMA sheet mix 101 may include any suitable rejuvenating oil 103 that is capable of restoring the maltenes and asphaltenes to the recycled HMA sheet mix 101. Suitable rejuvenating oils 103 include petroleum-based fractions of asphaltenes and/or maltenes. Non-limiting examples of suitable rejuvenating agents include Cyclogen® (Grade L or M) (Tricor Refining, LLC) and Viplex 50 (Crowley Chemical).

In one or more embodiments, the recycled HMA sheet mix 101 also includes an ethene polymer 104 (e.g., oxidized polyethylene, such as Epolene® EE-2 Polymer offered by Westlake Polymers LLC and Westlake Chemical Corporation) on the recycled fines 102. In one or more embodiments, the weight of the ethene polymer 104 is approximately 1% to approximately 7% of the total weight of the total binder content in the recycled HMA sheet mix 101, not including the ethene polymer 104 itself (e.g., the weight of the ethene polymer 104 in the recycled HMA sheet mix 101 is from approximately 1% to approximately 7% of the total combined weight of the rejuvenating oil 103, the paving grade asphalt binder oil 105, and the virgin asphalt binder 107). In one or more embodiments, the ethene polymer 104 comprises approximately 3% to approximately 5% of the total weight of the total binder content in the recycled HMA sheet mix 101, not including the ethene polymer 104 itself (e.g., the ethene polymer 104 comprises from approximately 3% to approximately 5% of the total combined weight of the rejuvenating oil 103, the paving grade asphalt binder oil 105, and the virgin asphalt binder 107).

Unlike virgin aggregate fines which are made of "clean" aggregate and are void of any binder oil, the recycled fines 102 of the recycled HMA sheet mix 101 include a paving grade asphalt binder oil 105 that was originally added to the original virgin aggregate of the subsequently reclaimed asphalt pavement (RAP). Furthermore, in some embodiments, because the recycled "extra fine" range of aggregate sizes have more surface area than RAP mixes with larger aggregates, the recycled fines 102 of the presently disclosed recycled HMA sheet mix 101 have a higher concentration of the asphalt binder oil 105 (e.g., 5.8% to 7.8% binder or up to about 8 to 9%) compared to the concentration of binder (e.g., 4.5% to 6.5% binder) for coarser aggregate mixtures used in recycled HMA (i.e., RAP HMA). (See, e.g., The Greenbook, 2018, Section 203-6, supra, and "Standard Specifications," 2015, Caltrans, Sections 39 and 92, supra, the entire content of which is incorporated herein by reference.) Accordingly, other than the addition of the rejuvenating agent and/or the ethene polymer (e.g., oxidized polyethylene, such as Epolene® EE-2 Polymer), a recycled HMA sheet mix composition made exclusively from the separated fines of a RAP composition inherently has up to about 8% to 9% recycled binder which is not found in a virgin HMA sheet mix. For example, a recycled HMA sheet mix composition made from a gradation of "extra fine" fines of a RAP composition, inherently has an estimated about 4% to about 9% (e.g., about 5.85% to about 7.8%) recycled binder which is not found in a virgin HMA sheet mix. Furthermore, a recycled HMA sheet mix made of more than 50% RAP will also have an increased recycled binder content compared to a virgin HMA sheet mix or any HMA sheet mix having less than 50% RAP. As understood by the skilled person, the amount of binder content in a recycled HMA sheet mix of more than 50% RAP will vary and may not be constant between lots of RAP. Accordingly, in some embodiments of the present disclosure, a recycled HMA sheet mix made of more than 50% of a RAP lot has an increased amount of binder compared to a recycled HMA sheet mix made of less than 50% of the same RAP lot or a comparable RAP lot.

Without being bound by any particular mechanism or theory, the presence of the "reclaimed" binder oil 105 in the recycled HMA sheet mix 101 may provide increased stability to the recycled HMA sheet mix 101.

In some embodiments of the present disclosure, all or substantially all of the fines of the recycled HMA sheet mix composition 101 are the recycled fines 102 (e.g., the recycled HMA sheet mix composition 101 comprises 100% recycled fines 102, the rejuvenating agent 103, and (optionally) the ethene polymer 104 (e.g., oxidized polyethylene, such as Epolene® EE-2 Polymer). That is, in one or more embodiments, the recycled HMA sheet mix composition 101 may comprise fines, the rejuvenating agent 103, and (optionally) the ethene polymer 104 (e.g., oxidized polyethylene, such as Epolene® EE-2 Polymer), in which the fines consist essentially of the recycled fines 102 (i.e., fines from a RAP composition). Accordingly, an embodiment of the recycled HMA sheet mix composition 101 that comprising fines, the rejuvenating agent 103, and (optionally) the ethene polymer 104 (e.g., oxidized polyethylene, such as Epolene® EE-2 Polymer), in which the fines consist essentially of the 100% recycled fines 102 does not include any substantial amount of any virgin (i.e., non-recycled) aggregate (e.g., virgin fines). For the recycled HMA sheet mix composition 101 consisting essentially of the recycled fines 102 (not including the rejuvenating agent 103 and the ethene polymer 104), "any substantial amount" refers to an amount of virgin fines that is 0.9% or less, 0.8% or less, 0.7% or less, 0.6% or less, 0.5% or less, 0.4% or less, 0.3% or less, 0.2% or less, or 0.1% or less.

In some embodiments of the present disclosure, the recycled HMA sheet mix composition 101 may include a mix of the recycled fines 102 (i.e., the fines 102 separated from a RAP composition that include the reclaimed binder oil 105) with virgin fines 106 together with the rejuvenating agent 103 and (optionally) the ethene polymer 104 (e.g., oxidized polyethylene, such as Epolene® EE-2 Polymer). As used herein "virgin fines" refer to newly processed aggregate that are free of reclaimed binder. Accordingly, in some embodiments, the recycled HMA sheet mix composition 101 may comprise fines, the rejuvenating agent 103, and (optionally) the ethene polymer 104 (e.g., oxidized polyethylene, such as Epolene® EE-2 Polymer), in which the fines comprise more than 50% recycled fines 102 with a corresponding amount of less than 50% virgin fines 106 down to 0% virgin fines 106. In some embodiments, the recycled HMA sheet mix composition 101 may comprise fines comprising 51%, 52%, 53%, 54%, 55%, 56%, 57%, 58%, or 59% recycled fines 102 with a corresponding amount of 49%, 48%, 47%, 46%, 45%, 44%, 43%, 42%, or 41% virgin fines 106, respectively, and mixed together with the rejuvenating agent 103 and (optionally) the ethene polymer 104 (e.g., oxidized polyethylene, such as Epolene® EE-2 Polymer).

In some embodiments of the present disclosure, the recycled HMA sheet mix composition 101 may comprise fines, the rejuvenating agent 103, and (optionally) the ethene polymer 104 (e.g., oxidized polyethylene, such as Epolene® EE-2 Polymer), in which the fines comprise at least 60% recycled fines 102 with a corresponding amount of 0% up to about 40% virgin fines 106. For example, mixed together with the rejuvenating agent 103 and (optionally) the ethene polymer 104 (e.g., oxidized polyethylene, such as Epolene® EE-2 Polymer), the recycled HMA sheet mix composition 101 may include fines of 60% recycled fines 102 and 40% virgin fines 106, 65% recycled fines 102 and 35% virgin fines, 70% recycled fines 102 and 30% virgin fines 106, 75% recycled fines 102 and 25% virgin fines 106, 80% recycled fines 102 and 20% virgin fines 106, 85% recycled fines 102 and 15% virgin fines 106, 90% recycled fines 102 and 10% virgin fines 106, 91% recycled fines 102 and 9% virgin fines 106, 92% recycled fines 102 and 8% virgin fines 106, 93% recycled fines 102 and 7% virgin fines 106, 94% recycled fines 102 and 6% virgin fines 106, 95% recycled fines 102 and 5% virgin fines 106, 96% recycled fines 102 and 4% virgin fines 106, 97% recycled fines 102 and 3% virgin fines 106, 98% recycled fines 102 and 2% virgin fines 106, or 99% recycled fines 102 and 1% virgin fines 106.

In some embodiments of the present disclosure, the recycled HMA sheet mix composition 101 comprises the rejuvenating agent 103, the ethene polymer 104 (e.g., oxidized polyethylene, such as Epolene® EE-2 Polymer), and fines, the fines consisting essentially of 60% recycled fines 102 and 40% virgin fines 106, 65% recycled fines 102 and 35% virgin fines 106, 70% recycled fines 102 and 30% virgin fines 106, 75% recycled fines 102 and 25% virgin fines 106, 80% recycled fines 102 and 20% virgin fines 106, 85% recycled fines 102 and 15% virgin fines 106, 90% recycled fines 102 and 10% virgin fines 106, 91% recycled fines 102 and 9% virgin fines 106, 92% recycled fines 102 and 8% virgin fines 106, 93% recycled fines 102 and 7% virgin fines 106, 94% recycled fines 102 and 6% virgin fines 106, 95% recycled fines 102 and 5% virgin fines 106, 96% recycled fines 102 and 4% virgin fines 106, 97% recycled fines 102 and 3% virgin fines 106, 98% recycled fines 102 and 2% virgin fines 106, or 99% recycled fines 102 and 1% virgin fines 106.

In one or more embodiments, the recycled HMA sheet mix 101 may also include a virgin asphalt binder 107. While the recycled HMA sheet mix 100 inherently has its "original" asphalt binder 105 found in the original HMA pavement which was subsequently reclaimed (i.e., the recycled fines 102 inherently have the asphalt binder 105 from the RAP composition from which the recycled fines 102 were separated), it may be desired to add the additional asphalt binder 107 to the recycled HMA sheet mix 101. Additionally, while the amount of binder content present in an embodiment of the recycled HMA sheet mix 101 containing more than 50% RAP may be a suitable amount for any intended application, in one or more embodiments, an embodiment of the recycled HMA sheet mix composition 101 containing more than 50% RAP may include the virgin asphalt binder 107. As used herein, "virgin asphalt binder" refers to an asphalt binder that is added to the recycled HMA sheet mix 101 and is therefore distinguished from the "original" or "recycled" asphalt binder oil 105 in the recycled fines 102 (i.e., the fines 102 separated from the RAP composition). As used herein, an "asphalt binder" refers to the principal binding agent in the recycled HMA sheet mix 100. Accordingly, in some embodiments, the recycled HMA sheet mix composition 100 having more than 50% RAP may also include up to about 7% virgin asphalt binder 107. In some embodiments, the recycled HMA sheet mix composition 100 includes up to 6%, 5.5%, 5%, 4.5%, 4%, 3.5%, 3%, 2.5%, 2%, 1.5%, 1%, or 0.50% virgin asphalt binder 107. Also, in some embodiments of the present disclosure, there is no requisite for the added asphalt binder 107 to be the same asphalt binder that "comes with" the recycled fines 102 of the RAP. Accordingly, in one or more embodiments, the composition of the added virgin asphalt binder 107 may be the same as or different than the composition of the asphalt binder oil 105 in the recycled fines 102. Furthermore, while it may be known or determined, it is not necessary to determine the type of original asphalt binder 105 in the recycled fines 102.

The virgin asphalt binder 107 may be any suitable type or kind of asphalt binder Non-limiting examples of suitable virgin asphalt binders include neat (plain) paving grade asphalt binders, polymer modified binders, Performance Grade (PG) asphalt binders, PG modified asphalt binders, polymer-modified asphalt binders, rubber-modified asphalt binders (e.g., asphalt rubber and terminal blend), or combinations thereof, all of which are disclosed in the art, e.g., the Greenbook, 2018, Section 203-14; "Standard Specifications, " 2015, Caltrans, Sections 39 and 92, supra; and Han et al., 2016, "Current status and development of terminal blend tyre rubber modified asphalt," Construction and Building Materials, 128, pages 399-409, the entire contents of all of which are herein incorporated by reference. In one or more embodiments, the binder 107 may include liquid asphalt, as described in The Greenbook, Section 203-2 "Liquid Asphalt," the entire contents of which are incorporated herein by reference. The liquid asphalt may be a slow curing (SC) liquid asphalt (i.e., natural crude oils or residual oils from refining of crude asphaltic petroleum, or products resulting from fluxing of a paving asphalt with a light oil), a medium curing (MC) liquid asphalt (i.e., a paving asphalt fluxed or blended with a kerosene-type solvent), or a rapid curing (RC) liquid asphalt (i.e., a paving asphalt fluxed or blended with a naphtha solvent).

As understood by those of skill in the art, the rubber-modified asphalt binders may be referred to using different nomenclature and/or may vary in how the modifiers are processed. Non-limiting examples of rubber-modified asphalt binders include terminal blend (i.e., terminal blended rubberized asphalt), asphalt rubber binders (AR), modified asphalt rubber binders (MAR), polymer modified asphalt rubber, and synthetic latex rubber binders, the standards and methods for which are well known and described specifically in the art, for example in "Standard Specifications," 2015, Caltrans, Section 39 and 92 supra; "Polymer Modified Asphalt—A Solution to Many Asphalt Problems," The Masterbuilder, Sonjoy Deb, November 2012, pages 194-198 and U.S. Pat. No. 6,242,524 "Binder For Non-Woven Fabric," the entire contents of all of which are incorporated herein by reference.

As used herein, the terms "terminal blend" and "terminal blend binder" are used interchangeably to refer to a wet process where a fine mesh crumb rubber is blended with asphalt, as described in the art, for example, in Han et al., 2016, supra. In some embodiments, terminal blend binders contain from about 5 to about 18% or more crumb rubber depending on their final application.

In some embodiments, the recycled HMA sheet mix 100 as disclosed herein includes recycled rubber using a "wet process." Accordingly, recycled rubber may be added to paving grade asphalt oil as described in U.S. Pat. Nos. 3,891,585 and 4,069,182, both issued to Charles H. McDonald; and U.S. Pat. No. 4,166,049 issued to Bobby J. Huff, or as described as "crumb rubber" in the Greenbook, Section 203-11.4, the entire contents of all of which are incorporated herein by reference.

Alternatively, according to other embodiments, recycled crumb rubber may be obtained from scrap tires and mixed with the recycled HMA using a "dry process" to form a recycled HMA rubber sheet mix composition, as disclosed in the Greenbook, Section 203-13, the entire content of which is incorporated herein by reference.

In some embodiments, the mixing and processing of the asphalt-rubber paving material of the present invention may be performed in accordance with many available standards related to asphalt rubber paving material. For example, the asphalt-rubber paving material may be prepared in accordance with the standards disclosed in one of the following, or a combination of the following: the Greenbook, 2018, Section 203-11, supra; "Standard Specifications," 2015, Caltrans, Section 39, supra; the American Society for Testing and Materials (ASTM) D 8-02 Standard Definitions of Terms Relating to Materials for Roads and Pavements; and ASTM D 6114/D 6114M-09, the entire contents of all of which are incorporated herein by reference.

As used herein, crumb rubber modifier (CRM) is defined as a combination of scrap tire CRM and high natural CRM as described in Greenbook, 2018, Section 203-11, supra, the entire contents of which are incorporated by reference. In some embodiments of the present invention, the thermoplastic paving material includes the asphalt-rubber binder as defined in the Greenbook 2018, Section 203-11, supra and Section 203-14, and "Standard Specifications," 2015, Caltrans, Section 39, supra, where the "total weight of asphalt-rubber binder, is about 80 percent±2 percent combined paving asphalt and asphalt modifier, and 20 percent±2 percent CRM. However, the minimum amount of CRM is not less than about 18 percent."

In some embodiments of the present disclosure, the recycled HMA sheet mix composition 101 includes an asphalt-rubber as defined in ASTM D 8-02 Standard Definitions of Terms Relating to Materials for Roads and Pavements, supra. That is, the asphalt-rubber is "a blend of asphalt cement, reclaimed tire rubber, and certain additives in which the rubber component is at least 15% by weight of the total blend and has reacted in the hot asphalt cement sufficiently to cause swelling of the rubber particles."

The use of the virgin asphalt binder 107 having a rubber component may be used alone or in combination with another binder, such as a non-rubber asphalt binder. Non-limiting examples of other non-rubber asphalt binders include neat (plain) paving grade asphalt binders, polymer modified binders, Performance Grade (PG) asphalt binders, PG modified asphalt binders, and/or polymer-modified asphalt binders, the standards and methods for which are well known and described specifically in the art, for example in "Standard Specifications," 2015, Caltrans, Section 39 and 92 supra; and "Polymer Modified Asphalt—A Solution to Many Asphalt Problems," The Masterbuilder, Sonjoy Deb, November 2012, pages 194-198, the entire contents of both of which are incorporated herein by reference.

In one or more embodiments, the recycled HMA sheet mix 101 may include one or more additional components 108 (e.g., one or more additives) to improve the strength and stability of the paving composition 100 made of the recycled HMA sheet mix 101. In one or more embodiments, the recycled HMA sheet mix 101 may include both the virgin asphalt binder 107 and the one or more additional components 108 (e.g., the one or more additives). That is, in addition to the virgin asphalt binder 107 used as a binding agent in the recycled HMA sheet mix 101, in order to improve the strength and stability of the paving composition 100 made of the recycled HMA sheet mix 101 as disclosed herein having more than 50% RAP, the one or more additional components 108 (e.g., additives) may be dispersed within the recycled HMA sheet mix 101. In one or more embodiments, the additional components 108 include at least one type of asphalt modifier (i.e., additive). In general, asphalt modifiers include any additive (e.g., natural, synthetic, or chemical) that may improve the characteristics of the recycled HMA sheet mix 101. These added modifiers may, for example and without limitation, increase or decrease the viscosity of the bituminous asphalt in the recycled HMA sheet mix 101, increase the softening point temperature of the recycled HMA sheet mix 101, and/or increase the integrity of the recycled HMA sheet mix 101. For example, an increase in the integrity (e.g., tensile strength) of the recycled HMA sheet mix 101 when applied in a pavement surface treatment (e.g., a thin lift overlay) may decrease the likelihood of the pavement surface becoming distressed—e.g., by stripping, thermal cracking, rutting, scuffing, and/or bleeding. In some embodiments, the recycled HMA sheet mix composition 101 comprises fines (recycled fines 102 with or without virgin fines 106), the rejuvenating agent 103, the ethene polymer 104 (e.g., oxidized polyethylene, such as Epolene® EE-2 Polymer), the binder 107, and the at least one type of suitable asphalt modifier 108 (i.e., an additive). In some embodiments of the present disclosure, the asphalt modifier 108 (i.e., the additive) includes without limitation any suitable warm mix additive, polyester or aramid fiber, hydrated lime, and/or a recycled plastic additive.

Suitable warm mix additives are known in the art and described, for example, in Rubio et al., 2012, "Warm mix asphalt: an overview," Journal of Cleaner Production, 24, pages 76-84, the entire content of which is incorporated herein by reference. Suitable polyester or aramid fibers are known and described in the art, for example, Shunzhi et al., 2014, Construction and Building Materials, 61, pages 120-124, and Badeli et al., 2018, Construction and Building Materials, 174, pages 60-71, the entire contents of both of which are incorporated herein by reference.

In one or more embodiments, the one or more additional components 108 may include Hydrated lime (i.e., calcium hydroxide). Hydrated lime (i.e., calcium hydroxide) for use in HMA is known in the art to reduce the rate at which the bitumen in the HMA oxidizes. Hydrated lime may be added to the presently disclosed recycled HMA sheet mix as described, for example, in Section 39-2 "Hot Mix Asphalt" in the book of "Standard Specifications", 2015, published by Caltrans. In some embodiments, hydrated lime for use in HMA is made in compliance with ASTM C1097 and/or AASHTO M303, as manufactured, for example, by Lhoist North America.

In one or more embodiments, the one or more additional components 108 may include one or more plastic additives. Suitable plastic additives for asphalt mixes are plastic polymer modifiers as known and described in the art, for example, the recycled plastic modifiers MR6, MR8, or MR10 made by MacRebur® (UK).

FIG. 2 depicts a flowchart illustrating tasks of a method 200 of making a recycled hot mix asphalt (HMA) composition according to one embodiment of the present disclosure. In some embodiments of the present disclosure, the method 200 of making the recycled HMA composition includes a task 205 of size separating or size segregating recycled fines from a reclaimed asphalt pavement (RAP) composition by crushing and screening using a sieve (or sieves) and/or a screen (or screens) corresponding to the desired size(s) of the recycled fines. In one or more embodiments, the task 205 includes fractionating the RAP composition into different sizes (e.g., in task 205, the RAP aggregate is fractionated into courser fine fractions, intermediate fine fractions, and finer fine fractions). The recycled fines obtained in task 205 may be the recycled fines 102 described above with reference to the embodiment depicted in FIG. 1. As described above, the recycled fines from the RAP composition inherently include an asphalt binder (e.g., up to about 8% to 9% recycled binder) (e.g., asphalt binder 105 described above), which is not found in a virgin HMA sheet mix. The fines obtained following task 205 may have any of the size(s) described above (e.g., 100% (by dry aggregate weight) of the recycled fines are capable of passing through a ⅜-inch (9.5 mm) sieve and up to 25% (by dry aggregate weight) of the recycled fines are capable of passing through a No. 200 (0.075 mm) sieve).

In the illustrated embodiment, the method 200 also includes a task 210 of adding the recycled fines that were size segregated in task 205 for processing. In one or more embodiments, the task 210 of adding the fines may include feeding the size segregated recycled fines having the desired size(s) through a cold feed bin system (e.g., the recycled fines obtained from the RAP aggregate, which were fractionated into courser fine fractions, intermediate fine fractions, and finer fine fractions in task 205, are introduced for processing utilizing a series of cold feed bins in task 210).

In the illustrated embodiment, the method 200 also includes a task 215 of adding virgin fines (e.g., the virgin fines 106 described above) to the recycled fines added in task 210. The virgin fines may have any suitable composition described above. Additionally, any suitable amount of the virgin fines may be added to the recycled fines, as described above. For instance, an amount of virgin fines may be added such that the total fines comprise more than 50% recycled fines with a corresponding amount of less than 50% virgin fines down to 0% virgin fines (e.g., the fines may comprises 51%, 52%, 53%, 54%, 55%, 56%, 57%, 58% or 59% recycled fines with a corresponding amount of 49%, 48%, 47%, 46%, 45%, 44%, 43%, 42%, or 41% virgin fines, respectively). In one or more embodiments, the method 200 may not include the task 215 of adding the virgin fines.

In one or more embodiments, the method 200 includes a task 220 of heating the fines (e.g., recycled fines with or without virgin fines) at a temperature from 175° F. up to 400° F. In one or more embodiments, the task 220 of heating the fines is performed at or between 175° F. to 240° F. In one or more embodiments, the task 220 of heating the fines is performed at or between 250° F. to 330° F. As understood by the skilled person, the effective heating temperature will vary depending on the viscosity characteristics of the asphalt binder material in the recycled fines as well as the characteristics of any added virgin fines (optional task 215). In one or more embodiments, the task 220 of heating the fines (e.g., the fractionated fines from the RAP aggregate, with or without the virgin fines) may be performed utilizing a dryer drum. In one or more embodiments, the heated fines having different sizes (e.g., finer fines and the courser fines) may be mixed together in one or more pugmills fed by the dryer drum.

In one or more embodiments, the method 200 also includes a task 225 of adding a rejuvenating agent to the heated mixture of fines (e.g., recycled fines with or without virgin fines). The rejuvenating agent may be the same as the rejuvenating agent 103 described above with reference to FIG. 1 (e.g., the rejuvenating agent added in task 225 may include petroleum-based fractions of asphaltenes and/or maltenes). Methods and considerations for processing HMA are described, for example, in Hot-Mix Asphalt Paving Handbook, Appendix 1, Part I, 2001, U.S. Army Corps of Engineers, AC 150/5370-14A, supra, the entire content of which is incorporated herein by reference. In one or more embodiments, the task 225 of adding the rejuvenating agent may be performed utilizing one or more spray bars in a pugmill (e.g., a spray bar in the first pugmill fed by the dryer drum utilized in the task 220 of heating the fines).

In one or more embodiments, the method 200 may include a task 230 of adding virgin asphalt binder (e.g., the virgin asphalt binder 107 described above) to the heated mixture of fines. The virgin asphalt binder may have any suitable composition described above. In one or more embodiments, the composition of the added virgin asphalt binder added in task 230 may be the same as or different than the composition of the asphalt binder oil in the recycled fines added in task 210. Additionally, any suitable amount of the virgin asphalt binder may be added to the heated mixture of fines in task 230, such as any amount described above. In one or more embodiments, up to 7% virgin asphalt binder (e.g., up to 6%, 5.5%, 5%, 4.5%, 4%, 3.5%, 3%, 2.5%, 2%, 1.5%, 1% or 0.50% virgin asphalt binder) may be added to the recycled fines. Additionally, in one or more embodiments, the method 200 may not include the task 230 of adding the virgin asphalt binder. In one or more embodiments, the task 230 of adding the virgin asphalt binder may be performed utilizing one or more spray bars in a pugmill (e.g., a spray bar in the first pugmill fed by the dryer drum utilized in the task 220 of heating the fines).

In one or more embodiments, the method 200 may include a task 235 of adding ethene polymer (e.g., in pelletized form) to the heated mixture of fines. The ethene polymer added in task 235 may be the same as the ethene polymer 104 (e.g., oxidized polyethylene, such as Epolene® EE-2 Polymer) described above with reference to FIG. 1. Additionally, in one or more embodiments, the weight of the ethene polymer added in task 235 is approximately 1% to approximately 7% of the total weight of the total binder content in the recycled HMA sheet mix composition, not including the ethene polymer itself (e.g., the weight of the ethene polymer added in task 235 is from approximately 1% to approximately 7% of the total combined weight of the rejuvenating agent added in task 225, the paving grade asphalt binder oil of the recycled fines added in task 210, and the virgin asphalt binder added in task 230). In one or more embodiments, the weight of the ethene polymer added in task 235 is approximately 3% to approximately 5% of the total weight of the total binder content in the recycled HMA sheet mix composition, not including the ethene polymer itself (e.g., the weight of the ethene polymer added in task 235 is from approximately 3% to approximately 5% of the total combined weight of the rejuvenating agent added in task 225, the paving grade asphalt binder oil of the recycled fines added in task 210, and the virgin asphalt binder added in task 230). In one or more embodiments, the task 235 of adding the ethene polymer may be performed utilizing one or more spray bars in a pugmill (e.g., a spray bar in the first pugmill fed by the dryer drum utilized in the task 220 of heating the fines). In one or more embodiments, the task 235 of adding the ethene polymer may be performed before and/or after the task 220 of heating the fines. Additionally, in one or more embodiments, the task 235 of adding the ethene polymer may be combined with one or more other tasks of the method 200 (e.g., the task 235 of adding the ethene polymer may be performed with the task 225 of adding the rejuvenating agent, the task 230 of adding the virgin asphalt binder, and/or the task 240 of adding the one or more other additives (described below)). The ethene polymer added in task 235 may be in any suitable form, such as in liquid form or pelletized form, depending, for instance, on the stage at which the ethene polymer is introduced.

In one or more embodiments, the method 200 includes a task 240 of adding one or more additional components (e.g., one or more additives) to improve the strength and stability of a paving composition made of the resultant recycled HMA sheet mix. In one or more embodiments, the one or more additives added in task 240 may be any of the additives 108 described above (e.g., a suitable warm mix additive, polyester or aramid fiber, hydrated lime, and/or a recycled plastic additive). In one or more embodiments, the method 200 may not include the task 240 of adding the one or more additional components (e.g., the one or more additives). In one or more embodiments, the task 240 of adding the one or more additional components (e.g., the one or more additives) may be performed before and/or after the task 220 of heating the fines. For example, in or more embodiments in which the one or more additives include fibers (e.g., polyester and/or aramid fibers), the fibers may be introduced into the dryer drum utilized to heat the fines in task 220. Additionally, in one or more embodiments, the task 240 of adding the one or more additional components (e.g., the one or more additives) may be combined with one or more other tasks of the method 200 (e.g., the task 240 of adding the one or more additional components (e.g., the one or more additives) may be performed with the task 225 of adding the rejuvenating agent, the task 230 of adding the virgin asphalt binder, and/or the task 235 of adding the ethene polymer). In one or more embodiments, the task 240 of adding the additional components (e.g., one or more additives) may be performed utilizing one or more spray bars in a pugmill (e.g., a spray bar in the first pugmill fed by the dryer drum utilized in the task 220 of heating the fines).

Application of the recycled HMA sheet mix composition 100 as described in embodiments of the present disclosure may be used in any suitable pavement system. The recycled HMA sheet mix composition 101 may be applied to any pavement layer.

Figure 3:
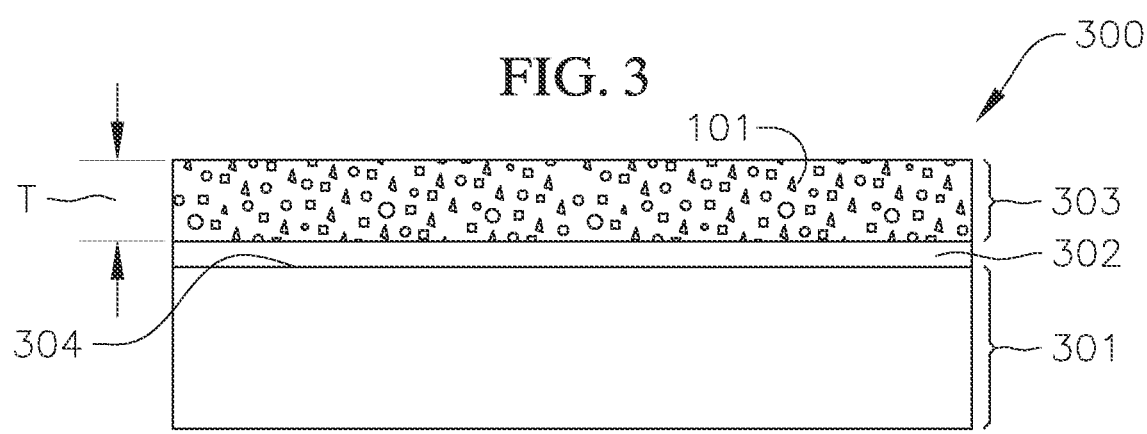
FIG. 3 is a schematic cross-sectional view of a pavement system including a recycled HMA sheet mix composition according to one embodiment of the present disclosure.

FIG. 3 is a schematic view of a pavement system 300 including the recycled HMA sheet mix composition 101 according to one embodiment of the present disclosure. In the illustrated embodiment, the pavement system 300 includes an existing pavement layer 301 (e.g., a first pavement layer), a tack coat 302 on the existing pavement layer 301, and a second pavement layer 303 on the tack coat 302. In the illustrated embodiment, the second pavement layer 303 is a thin-lift overlayer made of the recycled HMA sheet mix composition 101. Accordingly, in the illustrated embodiment, the thin-lift overlayer 303 made of the recycled HMA sheet mix composition 101 is adhered to the existing pavement layer 301 with the tack coat 302.

The existing pavement layer 301 may be any suitable type of pavement, such as a conventional hot mix asphalt layer, a chip seal layer (e.g., an asphalt-rubber aggregate membrane (ARAM) chip seal pavement), a micro-milled pavement, or a cold planed pavement. Additionally, in one or more embodiments, the existing pavement layer 301 may be an unprepared pavement layer or the existing pavement layer 301 may be prepared prior to applying the tack coat 302 and placing the thin-lift overlay 303 (e.g., a chip seal, such as an asphalt-rubber aggregate membrane (ARAM) chip seal, may be placed on the existing pavement layer 301; a slurry seal, such as a microsurfacing seal coat, a Type I slurry, or a Type II slurry, may be placed on the existing pavement layer 301; and/or the existing pavement layer 301 may be cold planed or micro-milled). Accordingly, in one or more embodiments, an upper surface 304 of the existing pavement layer 301 facing the thin-lift overlayer 303 made of the recycled HMA sheet mix composition 101 may be a macro-surface configured to increase the adherence (e.g., binding) of the thin-lift overlayer 303 made of the recycled HMA sheet mix composition 101 to the existing pavement layer 301. In one or more embodiments in which the existing pavement layer 301 is a chip seal layer, the chip seal layer may be a new chip seal application or the chip seal layer may be applied (using any type of suitable binder) to a milled pre-existing surface. Non-limiting examples of binders for chip seals include polymer-modified emulsions, polymer-modified binders, polymer-modified rejuvenating emulsions, terminal blend, and asphalt rubber as disclosed in Chapter 7 "Chip Seals," MTAG, Vol. 1, Flexible Pavement Preservation, 2nd Edition, Oct. 30, 2007, the entire content of which is incorporated herein by reference.

The application of and selection of the tack coat 302 are well known in the art, as described, for example in "Tack Coat Guidelines," State of California, Department of Transportation (Caltrans), Division of Construction, April 2009, pages 1-42, the entire content of which is incorporated herein by reference. In one or more embodiments, the tack coat 302 may be, for example, eTac™ tack coat (Ergon Asphalt and Emulsions, Inc.). Non-limiting examples of the tack coat 302 suitable for use with a chip seal pavement include an SS1H tack coat. In one or more embodiments, the pavement system 300 may be provided without the tack coat 302 between the existing pavement layer 301 and the thin-lift overlayer 303 made of the recycled HMA sheet mix composition 101.

In one or more embodiments, the thin-lift overlay layer 303 made of the recycled HMA sheet mix composition 101 of the present disclosure may have a thickness ("T") that is less than the conventional thickness of thin-lift overlays. In some embodiments, the thickness T of a thin-lift overlay 303 of the recycled HMA sheet mix 101 of the present disclosure may range from about ⅛ inch up to about 2 inches. In some embodiments, the thickness T of the thin-lift overlay 303 is not required to have the same thickness across the pavement system 300. For instance, the pavement surface (e.g., the first layer 301) may not have an even surface or there may be a reason for the thin-lift overlay 303 to not have the same thickness throughout, and as such the thin-lift overlay 303 (e.g., the second layer) may be thicker in some areas of the pavement system 300 than in other areas. In some embodiments of the present disclosure, the thin-lift overlay 303 made with the recycled HMA sheet mix composition 101 has a thickness T of about ⅛ inch up to about 1⅞ inches, up to about 1¾ inches, up to about 1⅝ inches, up to about 1½ inches, up to about 1⅜ inches, up to about 1¼ inches, or up to about 1 inch. In some embodiments of the present disclosure, the thin-lift overlay 303 made with the recycled HMA sheet mix composition 101 has a thickness T of about ⅛ inch up to about ⅞ inch, up to about ¾ inch, up to about ⅝ inch, up to about ½ inch, or up to about ¼ inch. In still other embodiments, the thin-lift overlay 303 made with the recycled HMA sheet mix composition 101 has a thickness T of about ¼ inch up to about 2 inches, up to about 1⅞ inches, up to about 1¾ inches, up to about 1⅝ inches, up to about 1½ inches, up to about 1⅜ inches, up to about 1¼ inches, up to about 1 inch, up to about ⅞ inch, up to about ¾ inch, up to about ⅝ inch, or up to about ½ inch.

FIG. 4 is a flowchart illustrating tasks of a method 400 of making the embodiment of the pavement system 300 including the recycled HMA sheet mix composition 101 depicted in FIG. 3 according to one embodiment of the present disclosure.

In the illustrated embodiment, the method 400 includes a task 405 of preparing an existing pavement layer (e.g., existing pavement layer 301) to form an upper "macro surface" (e.g., upper surface 304) on the existing pavement layer (e.g., by applying a chip seal to the existing pavement layer; by applying a slurry seal, such as a microsurfacing seal coat, a Type I slurry, or a Type II slurry, to the existing pavement layer; and/or by micro-milling or cold planing the existing pavement layer) to thereby increase the adherence (e.g., binding) of a thin-lift overlay using the recycled HMA sheet mix, which is placed according to a subsequent task of the method 400. The existing pavement layer may be the same as the existing pavement layer 301 described above with reference to the embodiment illustrated in FIG. 3. The task 405 of preparing the existing pavement layer to form the upper macro surface may be performed by any suitable process or processes, such as by applying a chip seal layer, applying a slurry seal, and/or by micro-milling or cold planing. For example, in one or more embodiments, the task 405 may include micro-milling resurfacing of an existing pavement layer utilizing a drum with tips (teeth) to remove the top pavement surface thereby leaving a finer texture. In one or more embodiments, the task 405 may include cold planed resurfacing (e.g., cold milling or pavement milling) in which the drum tips are farther apart for the removal of the entire pavement or removal of about ½ inch to 3 inches of the pavement surface. For example, in task 405, an existing pavement may be milled (by a micro-mill or cold planing process) to remove distresses in the top parts of the pavement to achieve an upper textured surface configured to receive a tack coat and/or a thin-lift overlay of the recycled HMA sheet mix in one or more subsequent tasks of the method 400 to create an adhesive bond between the existing pavement layer and the thin-lift overlay of the recycled HMA sheet mix. Both micro-milling and cold planing resurfacing are known in the art as described, for example, in "The Power of Milling," 2009, Brooke Wisdom, Better Roads and "Fine-Mill Pavements for Smooth Thin Overlays, 2012, Dan Brown, Pavement Preservation Journal, the entire contents of both of which are incorporated herein by reference. For a chip seal application, any suitable chip seal binder or method of application may be used as described for example in Chapter 7 "Chip Seals," MTAG, Vol. 1, Flexible Pavement Preservation, 2nd Edition, Oct. 30, 2007, supra. In one or more embodiments, the method 400 may not include the task 405 of preparing the existing pavement layer (i.e., the existing pavement layer may not be prepared prior to application of the tack coat and/or the thin-lift overlay in one or more tasks of the method 400).

In the illustrated embodiment, the method 400 also includes a task 410 of applying a tack coat on the upper macro surface of the existing pavement layer (e.g., the chip seal layer, the slurry seal, or the cold-planed or micro-milled surface) formed in task 405, or, if the task 405 is not performed, on the unprepared existing pavement layer. The tack coat may be the same as the tack coat 302 described above with reference to the embodiment illustrated in FIG. 3. In one or more embodiments in which a chip seal layer is formed in task 405, the task 410 of applying the tack coat to the chip seal pavement layer may include applying any tack coat suitable for a chip seal pavement, such as an SS1H tack coat. The tack coat applied in task 410 is configured to adhere (e.g., bond) a thin-lift overlay using the recycled HMA sheet mix, which is placed according to a subsequent task of the method 400 on the pavement layer.

In one or more embodiments, the method 400 may not include the task 410 of applying the tack coat. The skilled person is capable of determining when a tack coat is required. While the application of a tack coat may be conventionally used with some HMA applications and less often with others, the application of a tack coat is optional and its use with any application is determined at the site of application. For example, should the application of the recycled HMA sheet mix to the prepared macro surface be delayed and not occur sequentially, it may be necessary to apply a tack coat to a macro surface that may not have required it had the application of the HMA sheet mix occurred without delay.

In the illustrated embodiment, the method 400 also includes a task 415 of placing a thin-lift overlay formed of recycled HMA sheet mix on the tack coat (if it is applied in task 410), on the upper macro surface (e.g., the chip seal, the slurry seal, the micro-milled surface, or the cold planed surface) of the existing pavement structure (if the existing pavement layer is prepared in task 405), or on the unprepared existing pavement layer (if task 405 is not performed). The thin-lift overlay placing in task 415 may be the same as the thin-lift overlayer 303 described above with reference to the embodiment illustrated in FIG. 3, which is made of the recycled HMA sheet mix composition 101 described above with reference to the embodiment illustrated in FIG. 1.

Accordingly, in one or more embodiments of the method 400, the macro surface pavement may be first created (e.g., by applying a chip seal or a slurry seal, or by micro-milling or cold planing the existing pavement layer) in task 405, followed by the application of a tack coat in task 410, and then application of the thin-lift overlay made of the recycled HMA sheet mix to the tack coat in task 415. In one embodiment of the method 400, the task 405 of preparing the existing pavement layer may not be performed, and the method 400 may include applying a tack coat to an unprepared existing pavement layer in task 410, and then application of the thin-lift overlay of the recycled HMA sheet mix on the tack coat in task 415. Any suitable tack coat may be applied between any of the pavement layers, or one or more of the tack coat layers may be omitted. That is, a tack coat may be applied to the macro surface and/or the chip seal layer depending on conditions and timing of the pavement system application.

With good adherence of the recycled HMA sheet mix (e.g., applied as a thin-lift overlay in task 415) to the macro surface of the existing pavement layer formed in task 405, a resulting pavement surface having a more composite-like composition may be achieved. The preparation of the pavement layer in task 405 will depend on the type of and/or characteristics of the specific pavement layer to receive the recycled HMA sheet mix thin-lift overlay. The intent with a composite-like composition is to avoid having the pavement layer and the recycled HMA sheet mix layer not adhere such that the recycled HMA sheet mix layer separates from the pavement layer to which it was applied in task 415. In other words, the goal is to have the recycled HMA sheet mix thin-lift overlay adhere to the macro surface pavement to which it is applied in task 415 and form a composite-like composition of the macro surface and the recycled HMA sheet mix. According to some embodiments of the present disclosure, while the formation of a completely monolithic composite may not result and is also not necessary, the preparation of the macro surface pavement layer in task 405 (e.g., the first layer) to receive the recycled HMA sheet mix composition thin-lift overlay (e.g., the second layer) increases adherence of the recycled HMA sheet mix to the pavement layer to form a composite-like pavement of a macro surface with a thin-lift overlay. However, in some embodiments, the task 405 of preparing the existing pavement layer may not be performed and the tack coat and the recycled HMA sheet mix thin-lift overlay may be applied to an unprepared existing pavement layer.

Construction of pavement systems utilizing thin-lift HMA overlays according to method 400 is faster and significantly more cost effective than a complete replacement of the pavement, with fewer impacts to the travelling public, and there are additional environmental benefits, such as emission reduction and noise reduction. In addition, applying a thin-lift overlay according to method 400 provides a smooth driving surface, improving ride quality and reducing fuel consumption compared to rough damaged pavements.

In additional embodiments of the present disclosure, the recycled HMA sheet mix 100 may be used in place of conventional HMA in a modified three layer "sandwich" or composite pavement system. These three layer "sandwich" layering systems are described in the art, for example, by the Western Pavement Maintenance Association (westernpma.org/compositelayering.php), the entire contents of which are incorporated herein by reference. Current standard applications for three-layer ("sandwich") pavement systems include applying a tack coat to a macro surface (e.g., a micro-milled or cold planed) followed by a leveling course of HMA, followed by an interlayer applied to the leveling course with a surface course (e.g., an overlay) of HMA applied to the interlayer. As known in the art and understood by a person of ordinary skill in the art, conventional types of HMA used in either or both the leveling course and/or the surface course of the three-layer composition pavement system include a range of HMA types. Non-limiting examples of conventional HMA types for use in a leveling course and/or surface course are disclosed in Section 39-2 "Hot Mix Asphalt" in the book of "Standard Specifications", 2015, published by the State of California Department of Transportation (Caltrans), the entire content of which is incorporated by reference. Any of the HMA types suitable for use in a leveling course and/or a surface course may be replaced with the recycled HMA sheet mix of the present disclosure.

Figure 5:
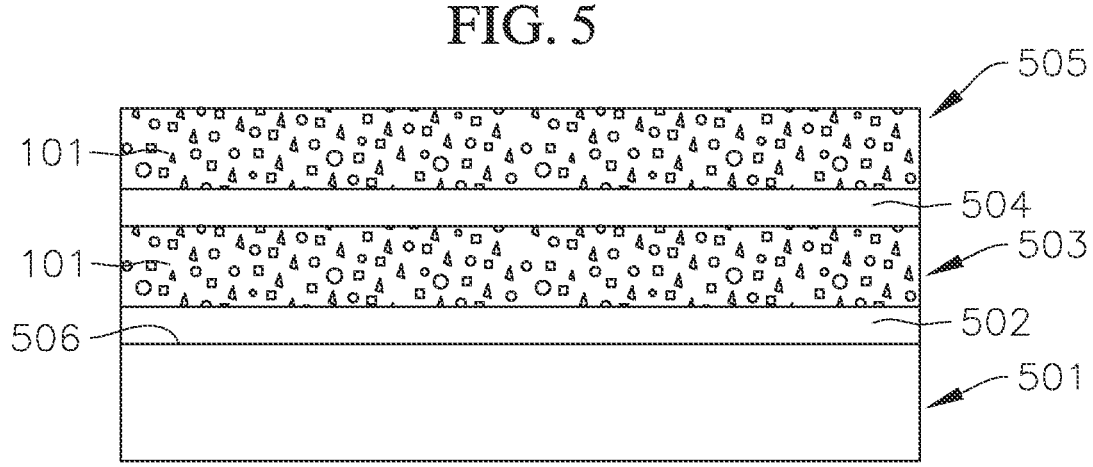
FIG. 5 is a schematic cross-sectional view of a three-layer pavement system including a recycled HMA sheet mix composition according to one embodiment of the present disclosure.

For example, FIG. 5 is a schematic view of a three layer "sandwich" pavement system 500 including a recycled HMA sheet mix composition 101 according to one embodiment of the present disclosure. In the illustrated embodiment, the pavement system 500 includes an existing pavement layer 501 (e.g., a first pavement layer), a tack coat 502 on the existing pavement layer 501, a leveling course layer 503 on the tack coat 502, an interlayer 504 on the leveling course 503, and a surface course layer 505 (e.g., an overlay) on the interlayer 504. In one or more embodiments, the leveling course layer 503 and/or the surface course layer 505 may include the recycled HMA sheet mix composition 101 (e.g., both the leveling course layer 503 and the surface course layer 505 may include the recycled HMA sheet mix composition 101, or only the leveling course layer 503 or the surface course layer 505 may include the recycled HMA sheet mix composition 101). In one or more embodiments, the three layer "sandwich" pavement system 500 may include a tack coat on the interlayer 504 (i.e., the system 500 may include a tack coat between the interlayer 504 and the surface course layer 505).

In one or more embodiments, the existing pavement layer 501 may be the same as the existing pavement layer 301 described above with reference to the embodiment illustrated in FIG. 3. For example, the existing pavement layer 501 may be an unprepared existing pavement layer or the existing pavement layer 501 may be prepared to have an upper macro surface 506 (e.g., by applying a chip seal, such as an asphalt-rubber aggregate membrane (ARAM) chip seal; by applying a slurry seal, such as a microsurfacing seal coat, a Type I slurry, or a Type II slurry; or by cold planing or micro-milling the existing pavement layer) facing the leveling course layer 503 to increase the adherence (e.g., binding) of the leveling course layer 503 to the existing pavement layer 501.

In one or more embodiments, the tack coat 502 may be the same as the tack coat 302 described above with reference to the embodiment illustrated in FIG. 3 (e.g., the tack coat 502 eTac™ tack coat (Ergon Asphalt and Emulsions, Inc.) or an SS1H tack coat). In one or more embodiments, the pavement system 500 may be provided without the tack coat 502 between the existing pavement layer 501 and the leveling course layer 503.

In one or more embodiments, the interlayer 504 may be, as a non-limiting example, an asphalt-rubber interlayer. Examples of asphalt-rubber interlayers include an asphalt-rubber stress absorbing membrane interlayer (SAMI-R) and an asphalt-rubber aggregate membrane interlayer (ARAM-I). In one or more embodiments, the interlayer 504 may be a geotextile interlayer (e.g., a woven fabric interlayer, a nonwoven fabric interlayer, or a monofilament woven interlayer, such as a TruPave® nonwoven pavement interlayer including high strength fiberglass and polyester fibers). In one or more embodiments, the interlayer 504 may be any other suitable type or kind of interlayer.

In some embodiments of the present disclosure, having the leveling course layer 503 and/or the surface course layer 505 made of the recycled HMA sheet mix 101 as disclosed herein allows for a reduction in the total thickness of the three-layer composite pavement system 500 compared to the total thickness of a conventional three-layer composite pavement system. For example, conventional three layer composite pavement systems may have a total thickness of about 3 inches, whereas the three layer composite pavement system 500 with the leveling course 503 including the recycled HMA sheet mix composition 101 and the surface course 505 including the recycled HMA sheet mix composition 101 may have a total thickness of 2 inches or about 2 inches while maintaining the strength and integrity of the conventional HMA types used in conventional three layer composite pavement systems. As understood by a person of ordinary skill in the art, with the application of a thinner leveling course layer and/or a thinner surface course layer, the cross-profile of the pavement system of an existing street pavement may be maintained or approximately maintained. In other words, the repair of an existing street pavement with a three-layer composite pavement system using thinner layers of the recycled HMA sheet mix allows for a repair to an existing street pavement with a three-layer composite pavement system that is up to 33% thinner than a conventional three-layer composite pavement system using a conventional type HMA. Accordingly, the use of a high percentage of RAP in an improved HMA pavement composition allows for a cost-effective and resourceful use of the RAP for paving (e.g., repairing and preserving) paved roads.

FIG. 6 is a flowchart illustrating tasks of a method 600 of making the embodiment of the three layer "sandwich" pavement system 500 depicted in FIG. 5 according to one embodiment of the present disclosure.

In the illustrated embodiment, the method 600 includes a task 605 of preparing an existing pavement layer (e.g., existing pavement layer 501) to form an upper "macro surface" (e.g., upper surface 506) on the existing pavement layer (e.g., by applying a chip seal to the existing pavement layer; by placing a slurry seal, such as a microsurfacing seal coat, a Type I slurry, or a Type II slurry, on the existing pavement layer; or by micro-milling or cold planing the existing pavement layer) to thereby increase the adherence (e.g., binding) of a leveling course layer (e.g., leveling course 503) using the recycled HMA sheet mix, which is deposited according to a subsequent task of the method 600. The existing pavement layer may be the same as the existing pavement layer 501 described above with reference to the embodiment illustrated in FIG. 3. The task 605 of preparing the existing pavement layer to form the upper macro surface may be performed by the same process or processes as the task 405 of preparing the existing pavement layer according to the embodiment described above with reference to FIG. 4 (e.g., by applying a chip seal, by applying a slurry seal, or by micro-milling or cold planing the existing pavement layer). For a chip seal application, any suitable chip seal binder or method of application may be used as described for example in Chapter 7 "Chip Seals," MTAG, Vol. 1, Flexible Pavement Preservation, 2nd Edition, Oct. 30, 2007, supra. In one or more embodiments, the method 600 may not include the task 605 of preparing the existing pavement layer (i.e., the existing pavement layer may not be prepared prior to application of the tack coat and/or the leveling course in one or more tasks of the method 600).

In the illustrated embodiment, the method 600 also includes a task 610 of applying a tack coat on the upper macro surface of the existing pavement layer (e.g., the chip seal layer, the slurry seal, or the cold-planed or micro-milled surface) formed in task 605, or, if the task 605 is not performed, on the unprepared existing pavement layer. The tack coat may be the same as the tack coat 502 described above with reference to the embodiment illustrated in FIG. 5. In one or more embodiments in which a chip seal layer is formed in task 605, the task 610 of applying the tack coat to the chip seal pavement layer may include applying any tack coat suitable for a chip seal layer, such as an SS1H tack coat. The tack coat applied in task 610 is configured to adhere (e.g., bond) a leveling course, which is placing according to a subsequent task of the method 600, to the existing pavement layer.

In one or more embodiments, the method 600 may not include the task 610 of applying the tack coat. The skilled person is capable of determining when a tack coat is required. While the application of a tack coat may be conventionally used with some HMA applications and less often with others, the application of a tack coat is optional and its use with any application is determined at the site of application. For example, should the application of the leveling course (which may include recycled HMA sheet mix) to the prepared macro surface be delayed and not occur sequentially, it may be necessary to apply a tack coat to a macro surface that may not have required it had the application of the leveling course occurred without delay.

In the illustrated embodiment, the method 600 also includes a task 615 of placing a leveling course layer on the tack coat (if it is applied in task 610), on the upper macro surface (e.g., the chip seal, the slurry seal, the micro-milled surface, or the cold planed surface) of the existing pavement structure (if the existing pavement layer is prepared in task 605), or on the unprepared existing pavement layer (if task 605 is not performed). In one or more embodiments, the leveling course layer may be made of the recycled HMA sheet mix composition 101 described above with reference to the embodiment illustrated in FIG. 1.

In the illustrated embodiment, the method 600 also includes a task 620 of applying a tack coat on the leveling course layer formed in task 615. The tack coat may be the same as the tack coat 502 described above with reference to the embodiment illustrated in FIG. 5. The tack coat applied in task 620 is configured to adhere (e.g., bond) an interlayer, which is applied in a subsequent task of the method 600, to the leveling course layer.

In one or more embodiments, the method 600 may not include the task 620 of applying the tack coat. For example, in one or more embodiments in which an interlayer is applied in a subsequent task, the method 600 may not include the task 620 of applying the tack coat on the leveling course layer formed in task 620. The skilled person is capable of determining when a tack coat is required. While the application of a tack coat may be conventionally used with some HMA applications and less often with others, the application of a tack coat is optional and its use with any application is determined at the site of application. For example, should the application of the interlayer to the leveling course be delayed and not occur sequentially, it may be necessary to apply a tack coat to the leveling course that may not have required it had the application of the interlayer occurred without delay.

In the illustrated embodiment, the method 600 also includes a task 625 of applying an interlayer on tack coat (if applied in task 620) or on the leveling course layer (if the tack coat is not applied in task 620). The interlayer may be the same as the interlayer 504 described above with reference to the embodiment illustrated in FIG. 5 (e.g., an asphalt-rubber interlayer).

In the illustrated embodiment, the method 600 also includes a task 630 of applying a tack coat on the interlayer formed in task 625. The tack coat may be the same as the tack coat 502 described above with reference to the embodiment illustrated in FIG. 5. The tack coat applied in task 630 is configured to adhere (e.g., bond) a surface course layer, which is deposited according to a subsequent task of the method 600, to the interlayer and (indirectly) to the leveling course layer.

In one or more embodiments, the method 600 may not include the task 630 of applying the tack coat. The skilled person is capable of determining when a tack coat is required. While the application of a tack coat may be conventionally used with some HMA applications and less often with others, the application of a tack coat is optional and its use with any application is determined at the site of application. For example, should the application of the surface course (which may include recycled HMA sheet mix) to the interlayer and the leveling course be delayed and not occur sequentially, it may be necessary to apply a tack coat to the interlayer that may not have required it had the application of the surface course occurred without delay.

In the illustrated embodiment, the method 600 also includes a task 635 of placing or applying a surface course layer on the tack coat (if it is applied in task 630) or on the interlayer formed in task 625 (if the tack coat is not applied to the interlayer in task 630). In one or more embodiments, the surface course layer may be made of the recycled HMA sheet mix composition 101 described above with reference to the embodiment illustrated in FIG. 1.

In some embodiments of the method 600 of forming the three-layer pavement system, the recycled HMA sheet mix 101 as disclosed herein with reference to FIG. 1 may be used as both the leveling course applied in task 620 and the surface course applied in task 635. Accordingly, in one or more embodiments of the method 600, the macro surface may be first created in the existing pavement layer (e.g., by applying a chip seal to the existing pavement, by applying a slurry seal to the existing pavement, or by micro-milling or cold planing the existing pavement layer) in task 605, followed by the application of a tack coat in task 610, followed by application of the leveling course layer made of the recycled HMA sheet mix 101 on the tack coat in task 615, followed by (optionally) application of a tack coat on the leveling course layer in task 620, followed by application of the interlayer on the tack coat or the leveling course in task 625, followed by (optionally) application of a tack coat on the interlayer in task 630, followed by application of the surface course layer made of the recycled HMA sheet mix 101 on the tack coat or the interlayer in task 635. Any suitable tack coat may be applied between any of the layers, or one or more of the tack coat layers may be omitted. That is, a tack coat may be applied to the existing pavement (e.g., the macro surface of the existing pavement layer), the leveling course, and/or the interlayer depending, for instance, on conditions and timing of the pavement system application. In one or more embodiments, the recycled HMA sheet mix 101 may be used as one of either the leveling course applied in task 620 or the surface course applied in task 635.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures, methods of manufacture, and methods of application can be practiced without meaningfully departing from the principles, spirit, and scope of this invention.

Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another layer or structure, it can be directly on the other layer or structure or intervening layer(s) and/or structures(s) may be present therebetween.

The tasks described above may be performed in the order described or in any other suitable sequence. Additionally, the methods described above are not limited to the tasks described. Instead, for each embodiment, one or more of the tasks described above may be absent and/or additional tasks may be performed.

What is claimed is:

1. A pavement composition, comprising:
   more than 50% to 100% recycled fines separated from a reclaimed asphalt pavement (RAP) composition, substantially all of the more than 50% to 100% recycled fines capable of passing through a sieve having an opening size of ⅜ inch (9.5 mm);
   liquid asphalt; and
   a rejuvenating agent mixed with the more than 50% to 100% recycled fines,
   wherein of the more than 50% to 100% recycled fines: 100% by dry aggregate weight is capable of passing through a ⅜ inch (9.5 mm) sieve, 70% to 90% by dry aggregate weight is capable of passing through a No. 4 (4.75 mm) sieve, 53% to 73% by dry aggregate weight is capable of passing through a No. 8 (2.36 mm) sieve, 26% to 42% by dry aggregate weight is capable of passing through a No. 30 (0.600 mm) sieve, 18% to 30% by dry aggregate weight is capable of passing through a No. 50 (0.300 mm) sieve, and 9% to 15% by dry aggregate weight is capable of passing through a No. 200 (0.075 mm) sieve.

2. A pavement composition, comprising:
   more than 50% to 100% recycled fines separated from a reclaimed asphalt pavement (RAP) composition, substantially all of the more than 50% to 100% recycled fines capable of passing through a sieve having an opening size of ⅜ inch (9.5 mm);
   liquid asphalt; and
   a rejuvenating agent mixed with the more than 50% to 100% recycled fines,
   wherein of the more than 50% to 100% recycled fines: 100% by dry aggregate weight is capable of passing through a ⅜ inch (9.5 mm) sieve, 95% to 100% by dry aggregate weight is capable of passing through a No. 4 (4.75 mm) sieve, 79% to 93% by dry aggregate weight is capable of passing through a No. 8 (2.36 mm) sieve, 40% to 54% by dry aggregate weight is capable of passing through a No. 30 (0.600 mm) sieve, 27% to 39% by dry aggregate weight is capable of passing through a No. 50 (0.300 mm) sieve, and 13% to 19% by dry aggregate weight is capable of passing through a No. 200 (0.075 mm) sieve.

3. A pavement system comprising:
   a thin-lift overlay on an existing pavement layer, the thin-lift overlay comprising a pavement composition, comprising:
       more than 60% to 100% recycled fines separated from a reclaimed asphalt pavement (RAP) composition, substantially all of the more than 60% to 100% recycled fines capable of passing through a sieve having an opening size of ⅜ inch (9.5 mm);
       liquid asphalt; and
       a rejuvenating agent mixed with the more than 60% to 100% recycled fines;
   a micro-milled surface on the existing pavement layer; and
   an asphalt-rubber aggregate membrane on the micro-milled surface, wherein the asphalt-rubber aggregate membrane is between the existing pavement layer and the thin-lift overlay.

4. A pavement composition, comprising:
   more than 60% to 100% recycled fines separated from a reclaimed asphalt pavement (RAP) composition, substantially all of the more than 60% to 100% recycled fines capable of passing through a sieve having an opening size of ⅜ inch (9.5 mm);
   liquid asphalt mixed with the more than 60% to 100% recycled fines; and
   oxidized polyethylene mixed with the more than 60% to 100% recycled fines.

5. The pavement composition of claim 4, wherein the liquid asphalt is a slow cure liquid asphalt.

6. The pavement composition of claim 4, wherein the liquid asphalt is a medium cure liquid asphalt.

7. The pavement composition of claim 4, wherein the liquid asphalt is a rapid cure liquid asphalt.

* * * * *